(12) United States Patent
Becoulet et al.

(10) Patent No.: US 12,116,901 B2
(45) Date of Patent: Oct. 15, 2024

(54) FAN MODULE COMPRISING IMPROVED SEALING MEANS FOR A LUBRICANT CHAMBER

(71) Applicant: SAFRAN AIRCRAFT ENGINES, Paris (FR)

(72) Inventors: Julien Fabien Patrick Becoulet, Moissy-Cramayel (FR); Olivier Formica, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/260,978

(22) PCT Filed: Jan. 10, 2022

(86) PCT No.: PCT/FR2022/050052
§ 371 (c)(1),
(2) Date: Jul. 11, 2023

(87) PCT Pub. No.: WO2022/153000
PCT Pub. Date: Jul. 21, 2022

(65) Prior Publication Data
US 2024/0240573 A1 Jul. 18, 2024

(30) Foreign Application Priority Data
Jan. 15, 2021 (FR) ...................... 2100395

(51) Int. Cl.
*F01D 25/18* (2006.01)
*F01D 25/16* (2006.01)
(Continued)

(52) U.S. Cl.
CPC .......... *F01D 25/183* (2013.01); *F01D 25/16* (2013.01); *F02C 3/107* (2013.01); *F02C 7/06* (2013.01);
(Continued)

(58) Field of Classification Search
CPC ........ F01D 25/16; F01D 25/183; F02C 3/107; F02C 7/06; F02C 7/28; F05D 2220/32;
(Continued)

(56) References Cited

U.S. PATENT DOCUMENTS 11,352,979 B2 * 6/2022 Yuen .................. F02K 3/06

FOREIGN PATENT DOCUMENTS

FR 3 013 385 A1 5/2015
FR 3075881 A1 * 6/2019 ............... F02C 7/28
WO 2018/113332 A1 6/2018

OTHER PUBLICATIONS

International Search Report mailed Mar. 25, 2022, issued in corresponding International Application No. PCT/FR2022/050052, filed Jan. 10, 2022, 5 pages.
(Continued)

*Primary Examiner* — Woody A Lee, Jr.
*Assistant Examiner* — Justin A Pruitt
(74) *Attorney, Agent, or Firm* — CHRISTENSEN O'CONNOR JOHNSON KINDNESS PLLC

(57) ABSTRACT

A turbomachine fan module includes a fan shaft and a lubrication chamber traversed axially by at least part of the fan shaft. The module further includes at least one first bearing configured to support and guide the fan shaft in rotation. The fan shaft has a first tubular part closed by a cover, wherein the first tubular part has a distal end and a proximal end that are opposite each other along a longitudinal axis X and an annular squealer cavity, formed in an inner surface of the fan shaft, between the distal end and the proximal end. The cover has a body extending along the longitudinal axis X and mounted in the first tubular portion so as to cover and sealingly close the annular squealer cavity.

10 Claims, 3 Drawing Sheets

(51) Int. Cl.
*F02C 3/107* (2006.01)
*F02C 7/06* (2006.01)
*F02C 7/28* (2006.01)

(52) U.S. Cl.
CPC ............ *F02C 7/28* (2013.01); *F05D 2220/32* (2013.01); *F05D 2240/50* (2013.01); *F05D 2240/55* (2013.01); *F05D 2240/60* (2013.01); *F05D 2260/40* (2013.01); *F05D 2260/98* (2013.01)

(58) Field of Classification Search
CPC ............. F05D 2240/50; F05D 2240/55; F05D 2240/60; F05D 2240/61; F05D 2260/40; F05D 2260/98
USPC .......................................................... 415/230
See application file for complete search history.

(56) References Cited

OTHER PUBLICATIONS

Written Opinion mailed Mar. 25, 2022, issued in corresponding International Application No. PCT/FR2022/050052, filed Jan. 10, 2022, 6 pages.
International Preliminary Report on Patentability mailed Jul. 4, 2023, issued in corresponding International Application No. PCT/FR2022/050052, filed Jan. 10, 2022, 7 pages.

\* cited by examiner

FAN MODULE COMPRISING IMPROVED SEALING MEANS FOR A LUBRICANT CHAMBER

FIELD OF THE INVENTION

This invention relates to the field of turbomachines. In particular, it refers to a fan module whose fan shaft is driven by a turbine shaft by means of a power transmission mechanism and to sealing means for a lubricant chamber in which this power transmission mechanism is installed.

TECHNICAL BACKGROUND

Turbomachines, such as turbofan engines, generally comprise a fan arranged upstream of a gas generator depending on the flowing of the gases in the turbomachine. The gas generator is housed in an annular internal casing, while the fan is housed in an annular external casing, generally secured to a nacelle. The fan drives a flow that is divided into a primary flow or hot flow circulating in a primary duct through the gas generator and a secondary or cold flow circulating in a secondary duct around the gas generator.

As shown in FIG. 1, the fan 3 of the turbomachine 1 is driven by a low-pressure shaft 2, possibly via a speed reducer 4. The latter is coupled to a shaft 5 of the fan 3, on which a fan disc carrying the blades of the fan 3 is sleeved. The fan shaft 5 is supported and guided by bearings comprising rolling elements such as balls or rollers. The bearings and the members of the speed reducer 4 require a constant lubrication and a cooling to ensure they operate correctly. A first bearing 6, a second bearing 7 on the fan shaft 5 and the reducer 4 are arranged in a single chamber 8 upstream of the turbomachine. The fan shaft is hollow and open at both ends. In addition, mounting the fan shaft on the speed reducer means that at least one portion of the interior of the fan shaft forms part of the chamber. To this end, this chamber 8 is sealed upstream by a first cover 9 which is mounted in the fan shaft 5, at the level of its downstream end 5P and at the level of the first bearing 6. The chamber 8 is also closed downstream by a second cover at least partly in the low-pressure shaft. The inlet 26 of the lubricant in the chamber to lubricate the bearings and the speed reducer, generally is made downstream of the speed reducer and more precisely at the level of a shell 26a.

Another example of the arrangement of the cover upstream of the fan shaft of a turbomachine is detailed in the document FR3013385 and in the document WO2018/113332.

However, in the above example arrangements, the output shaft of the speed reducer and the fan shaft have a complex geometry with shoulders, for example, which encourage the retention of lubricant (originating from the oil outlet) or water (originating from melting ice blocks, for example) in certain areas of them. A retention area located towards the free end of the fan shaft is particularly suitable for this type of retention. But, the retention generates liquid imbalances (e.g. oil or water imbalances) which have a negative impact on the dynamic behaviour of the turbomachine.

The aim of the present invention is to overcome the above-mentioned disadvantages, in particular by providing means for sealing the oil chamber allowing an effective retention for the lubrication of the elements contained therein, while avoiding the phenomena of imbalances, preferably liquid imbalances (e.g. oil or water imbalances).

SUMMARY OF THE INVENTION

This objective is achieved in accordance with the invention by means of a fan module for a turbomachine comprising a cylindrical fan shaft of the fan of longitudinal axis X driven in rotation by a power shaft via a speed reducer, and a lubrication chamber through which at least one portion of the fan shaft and of the power shaft pass axially, and in which at least a first bearing intended to support and guide in rotation the fan shaft and the speed reducer is arranged, the fan shaft comprising at least one first tubular portion forming part of the chamber and being closed by a cover, the first tubular portion comprising a distal end, a proximal end opposite one another along the longitudinal axis X and an annular squealer cavity, provided in an internal surface of the fan shaft, between the distal end and the proximal end, said cover comprising a body which extends along the longitudinal axis X and which is mounted in the first tubular segment so as to cover and seal the annular squealer cavity.

Thus, this solution allows to achieve the above-mentioned objective. In particular, the configuration of the cover and its arrangement inside the fan shaft allow to isolate the squealer cavity in such a way as to prevent the introduction of any fluid into it which could stagnate inside it and cause imbalances, in particular liquid imbalances. Moreover, this solution is simple, easy and inexpensive to manufacture and to implement.

The module also comprises one or more of the following characteristics, taken alone or in combination:
- the body comprises a circular cross-section with a diameter varying between the first end and the second end.
- the body extends between a first end and a second end, the first end comprising a first gorge open onto an external wall of the body and following the circumference thereof, the first gorge being intended to receive first sealing elements adapted to cooperate with the internal surface of the first tubular portion of the fan shaft.
- the second end comprises a second gorge open onto the external wall of the body and following the circumference thereof, the second gorge being intended to receive second sealing elements capable of cooperating with the internal surface of the first tubular portion of the fan shaft.
- the first end is attached to the distal end of the first tubular portion and the second end is arranged inside the first tubular portion.
- the first tubular portion comprises an annular bulge projecting radially inwards the fan shaft and delimiting the squealer cavity downstream, the second end of the cover coming into radial abutment against the annular bulge.
- the second sealing elements comprise a flexible radial lip intended to bear radially against the internal surface of the first tubular portion.
- the cover has a maximum external diameter smaller than the minimum internal diameter of the first tubular portion of the fan shaft.
- the cover is removably mounted in the first tubular portion of the fan shaft.
- the longitudinal body of the cover extends radially inside the squealer cavity.
- the fan module comprises a second bearing designed to support and guide the fan shaft in rotation, and arranged upstream of the first bearing, the second end of the cover being close to the second bearing.
- the module comprises means for axially retaining the first end of the first cover at the distal end of the first tubular portion of the fan shaft and configured to axially retain the cover relative to the fan shaft and within the fan shaft.

first and second sealing elements are arranged radially between the body of the cover and the fan shaft.

the cover comprises a threaded cylindrical bore centred on the longitudinal axis X.

The invention also relates to a turbomachine comprising a fan module which has the above-mentioned characteristic.

The invention further relates to an aircraft comprising at least one turbomachine as above-mentioned.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

Figure 1:
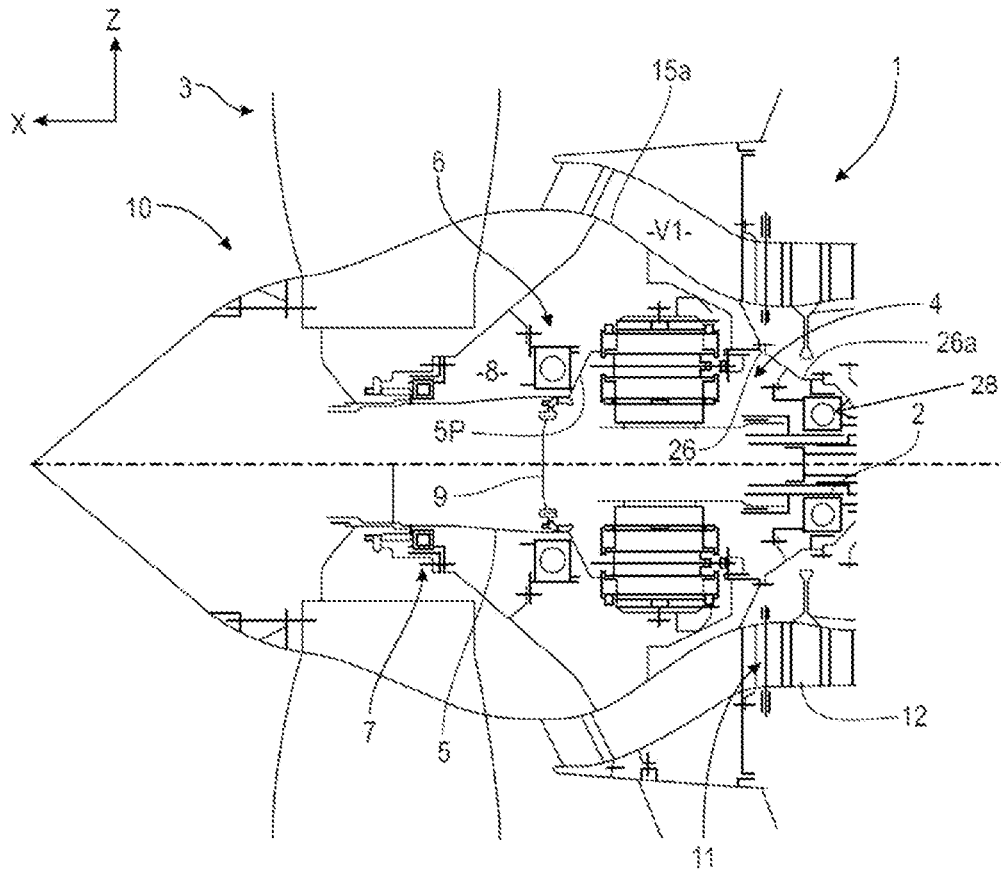
FIG. 1 shows a partial axial cross-section of a turbomachine comprising a fan module upstream of a gas generator and to which the invention applies.

FIG. 1 has been described in the above. The elements described above and identical in the remainder of this description have the same numerical references.

In the present invention, and in general, the terms "upstream" and "downstream" are defined in relation to the circulation of the gases in the turbomachine, which is substantially parallel to the longitudinal axis X. Similarly, the terms "internal", "external", "lower" and "upper" are defined with respect to a radial axis Z perpendicular to the longitudinal axis X and with respect to the distance from the longitudinal axis X.

Figure 2:
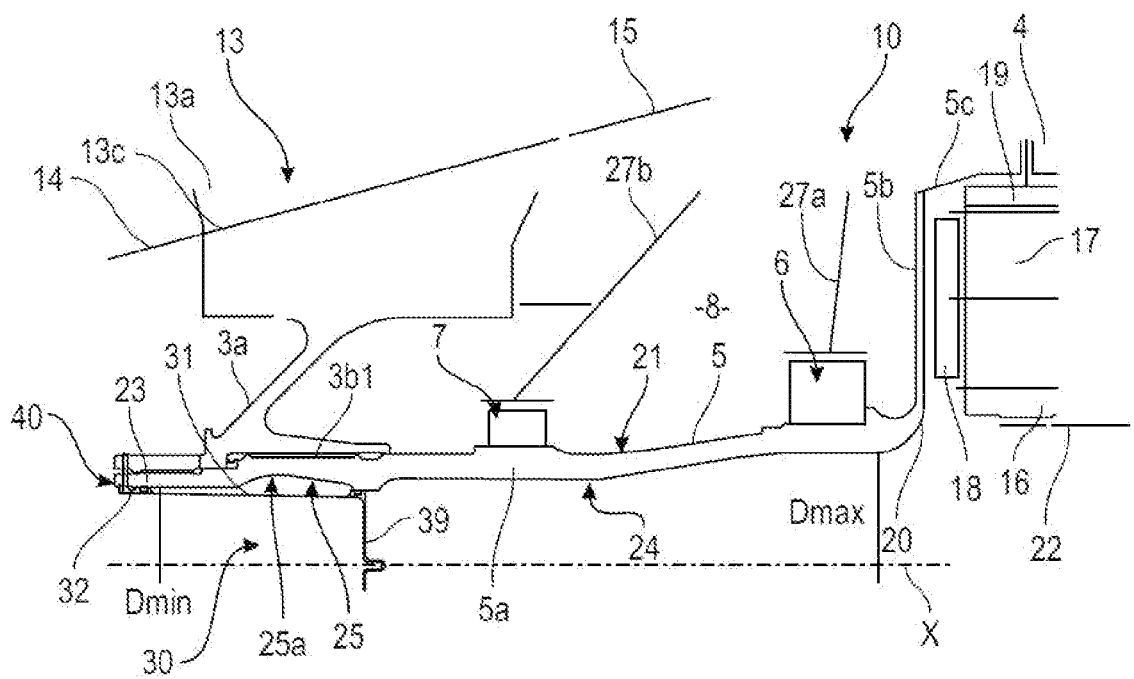
FIG. 2 is a schematic view, in axial and partial cross-section, of a fan module comprising at least one bearing and a speed reducer arranged in a lubrication chamber according to the invention.

FIG. 2 shows a fan module 10 with a fan 3 arranged upstream of a gas generator 11 of a turbomachine 1. The latter is intended to be mounted on an aircraft and is of the dual-flow and dual-body type. The turbomachine is axisymmetric with respect to the longitudinal axis X. Of course, the invention is applicable to other types of turbomachine.

The gas generator 11 comprises, for example, from upstream to downstream, a low-pressure compressor 12 (shown in FIG. 1), a high-pressure compressor (not shown), a combustion chamber (not shown), a high-pressure turbine (not shown) and a low-pressure turbine (not shown).

The module 10 comprises a fan shaft 5 which is centred on the longitudinal axis X. A fan disc 3a is sleeved onto the fan shaft 5. The fan comprises a series of fan vanes 13 extending radially outwards from the fan disc 3a and delimited radially by a fan casing (not shown). In particular, each fan vane 13 comprises a blade 13a, a root (not shown) and a platform 13c. The platform 13c separates the blade 13a from the root. The disc 3a comprises a plurality of cells distributed regularly around the longitudinal axis and in which the roots of the fan vanes 13 are received. The module 10 also comprises, upstream, an inlet cone 14 which envelops the fan shaft 5, forming an aerodynamic continuity with each platform 13c of the fan vanes 13. Downstream, the platform 13c also has a continuous surface with an internal casing 15. The latter determines a radially internal wall 15a of the primary duct V1 passing through the gas generator and at least partly enveloping the speed reducer 4.

The fan shaft 5 is cylindrical and hollow. The latter comprises, from upstream to downstream, a first tubular portion 5a extending along the longitudinal axis X, a second portion forming a radial web 5b extending along the radial axis outwards, and a third portion in the form of an annular shell 5c of longitudinal axis X. The first tubular portion 5a, the radial web 5b and the shell 5c are connected to each other by connecting radii. In this example, the first tubular portion 5a, the radial web 5b and the shell 5c are formed in a single piece. Alternatively, the first tubular portion 5a and the radial web 5b are in monobloc, the shell being fitted and attached to the radial web 5b. Alternatively, the first tubular portion 5a, the radial web 5b and the shell 5c are independent parts attached together.

The fan shaft 5 is driven in rotation by a power shaft of the turbomachine via a power transmission mechanism allowing to reduce the speed of rotation of the fan 3. This power shaft is a low-pressure turbine shaft 22 in this example. The power transmission mechanism allows a fan with a large diameter to be arranged, which allows to increase the bypass ratio. In this example, the bypass ratio of the fan is greater than 10. Preferably, the bypass ratio is between 15 and 20.

The power transmission mechanism comprises a speed reducer 4 formed by a gear train and known by the acronym RGB for "Reduction Gear Box". The gear train is epicyclic or planetary. In particular, the speed reducer 4 shown in FIG. 1 comprises an internal planetary, referred to here as sun gear 16, planet gears 17, a planet carrier 18 and an outer ring gear 19. In this example, the input of the speed reducer 4 is coupled to the low-pressure turbine shaft 22, while the output of the speed reducer 4 is coupled to the fan shaft 5. To this end, the speed reducer 4 comprises an input shaft secured in rotation to the low-pressure turbine shaft. Advantageously, the input shaft is coupled to the planetary 16 centred on the longitudinal axis X. The fan shaft 5 is coupled to the outer ring gear 19 via the shell 5c which ensures the attachment of the fan shaft 5 to the external ring gear 19. The radial web 5b allows the fan shaft 5 to adapt to the geometry of the speed reducer 4. The planet gears 17 are carried by the planet carrier 18 and each rotates about an axis substantially parallel to the longitudinal axis X. Each of the planet gears 18 meshes with the planetary 16 and the outer ring gear 19.

Other arrangements of the speed reducer 4 are, of course, conceivable. For example, the output of the speed reducer 4 is secured to the shell 5c of the fan shaft and of the planet carrier 18. The shell 5c ensures the attachment of the fan shaft 5 to the planet carrier 18. The input shaft of the speed reducer 4 is secured in rotation to the low-pressure turbine shaft 22 and to the planetary centred on the longitudinal axis X.

In FIG. 2, the fan shaft 5 is supported and guided in rotation by a first bearing 6 which is arranged towards a proximal end 20 of the first portion 5a of the fan shaft 5. At the proximal end 20 is defined an opening bordered by an annular surface of longitudinal axis X. The radial web 5b extends from the proximal end 20 of the first tubular portion 5a. A second bearing 7 is also provided to support and guide the fan shaft 5 in rotation. The second bearing 7 is mounted axially upstream of the first bearing 6, which is arranged upstream of the speed reducer 4. The first portion 5*a* of the fan shaft 5 allows to provide bearing seats for the first and second bearings 6, 7. The first and second rolling bearings 6, 7 each comprise an internal ring mounted on an external surface 21 of the fan shaft 5 (the bearing seat of the first tubular portion 5*a*) and an external ring mounted on a support shell 27*a*, 27*b*. The rolling elements in the first bearing 6 are balls, while the rolling elements in the second bearing 7 are rollers.

As can be seen in FIG. 2, the fan shaft 5 extends axially between the proximal end 20 and a distal end 23. The first tubular portion 5*a* of the fan shaft 5 has a circular cross-section. The fan shaft 5 has a reduction in cross-section from the proximal end 20 of the first tubular portion 5*a* at its axially opposite distal end 23. The minimum internal diameter Dmin is thus provided at the distal end 23 of the fan shaft. The maximum internal diameter Dmax is provided at the proximal end 20 of the first tubular portion 5*a* of the fan shaft 5.

The first tubular portion 5*a* also comprises an internal surface 24 which is radially opposite the external surface 21. In this internal surface 24 is provided an annular squealer cavity 25. In particular, this extends around the entire circumference of the internal surface 24. The squealer cavity has a surface 25*a* with a bottom defining a diameter greater than the minimum internal diameter Dmin located at the distal end 23. The surface 25*a* has a surface continuity with the internal surface 24 of the first tubular portion 5*a*. As can be seen in FIG. 2, the squealer cavity 25 is formed radially below the splines 3*b*1 of the disc 3*a* and of the fan shaft 5. In particular, the fan shaft 5 has splines on its external surface which co-operate with complementary splines arranged on the internal surface of the disc 3*a*. These splines 3*b*1 allow the disc and the fan shaft to rotate securely. The squealer cavity 25 has an axial length substantially equal to the length of the splines 3*b*1.

At least the bearings 6, 7 and the reducer 4 are arranged in a chamber 8 in which a lubricant such as oil circulates allowing to lubricate and to cool the bearings and the members of the speed reducer 4 at all times, in particular during the operation of the turbomachine. This allows to ensure that the bearings 6 and 7 and the speed reducer 4 operate correctly. The lubricant is injected into the chamber 8 via the lubricant inlet 26 (see FIG. 1) at the level of the bearings 6, 7, the bearings in the speed reducer and the toothing (of the planet gears, of the ring gear, of the sun gear) in the speed reducer and at the level of a third bearing 28 (shown in FIG. 1) which is located downstream of the speed reducer. The third bearing 28 supports and guides the low-pressure shaft 2, and in particular the low-pressure turbine shaft 22, in rotation. The third bearing 28 is a rolling bearing comprising an internal ring mounted on an external surface of the low-pressure turbine shaft 22 and an external ring mounted on a base plate which is secured to the shell 26*a*. The rolling elements of the third bearing 28 are balls. The chamber 8 extends on either side of the speed reducer 4 along the longitudinal axis X.

In FIG. 2, at least one portion of the fan shaft 5 passes axially through the chamber 8. The low-pressure turbine shaft 22 also passes partly through the chamber 8. In other words, the fan shaft 5 and the low-pressure turbine shaft 22 extend at least partly into this chamber 8. In the present example, the chamber 8 is formed at least by the cylindrical wall of the fan shaft 5 and the support shells 22*a*, 22*b*. More precisely still, the chamber 8 extends inside the fan shaft and around the fan shaft 5.

Figure 3:
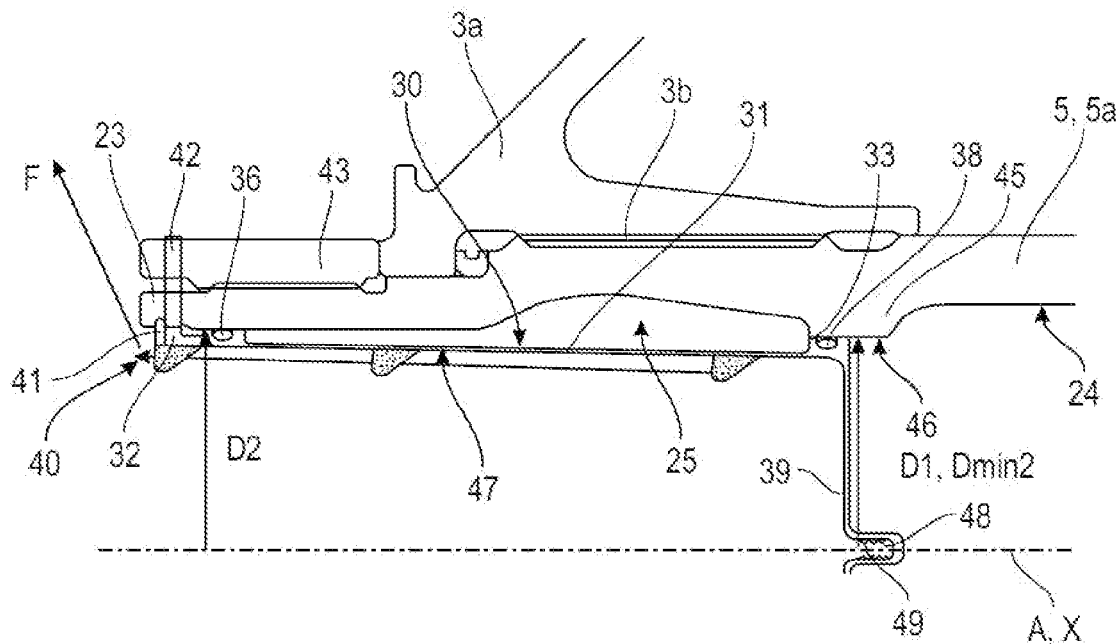
FIG. 3 is a detailed view of the integration of a sealing cover for the lubrication chamber of the fan module shown in FIG. 2.

With reference to FIGS. 2 and 3, the chamber 8 also comprises sealing means for sealing the chamber 8. These sealing means comprise a first removable cover 30 sealing the chamber 8 upstream. A second removable cover (not shown) is provided downstream to also seal the chamber. The second cover is mounted radially inside the low-pressure turbine shaft 22 and at an upstream end thereof. This second cover is mounted downstream of the speed reducer 4 and does not form part of the object of the invention.

In FIG. 3, which is a partial side view of the first cover 30, the latter comprises a body 31 extending along an axis A between a first end 32 and a second end 33. The body 31 is hollow and advantageously has a circular cross-section. The body 31 is rotationally symmetrical about the axis A. The axis A is coaxial with the longitudinal axis X in the installation situation. In this example, the body 31 has an external diameter which varies between the first end 32 and the second end 33. Advantageously, the maximum external diameter D2 is located at the level of the first end 32 and the minimum external diameter D1 is located at the level of the second end 33. The body 31 has a substantially frustoconical axial cross-section and the wall of the body 31 is inclined with respect to the axis A.

Figure 4:
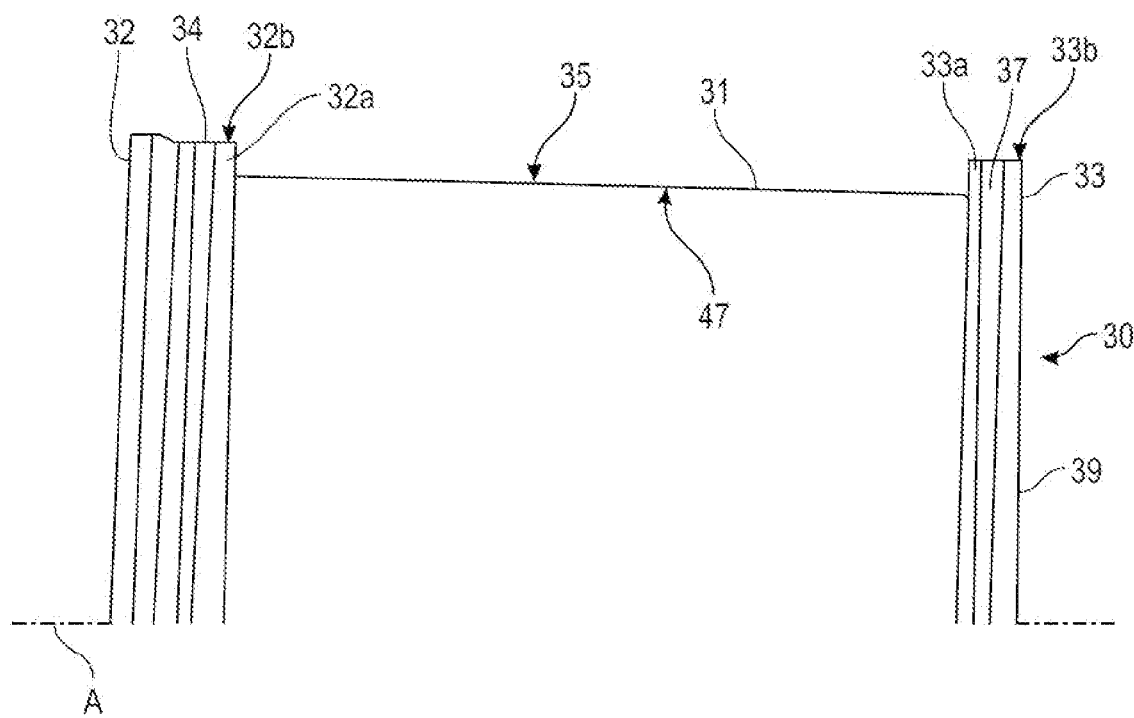
FIG. 4 illustrates schematically and partially an example of a sealing cover according to the invention; and, FIG. 5 shows a partial axial sectional view of another example of a cover mounted upstream of a fan shaft of a fan module according to the invention.

In FIG. 4, the cover 30 comprises a first gorge 34 that opens onto an external wall 35 of the body and follows its circumference. In particular, the first gorge 34 is carried by a first annular collar 32*a* which extends radially outside the body with respect to the axis A of the body. The first gorge 34 has a substantially U-shaped cross-section. This is intended to receive first sealing elements 36 shown in FIG. 3. The first sealing elements 36 are able to cooperate with the internal surface 24 of the first tubular portion 5*a* of the fan shaft 5. The first sealing elements 36 comprise an annular seal. A second gorge 37 is also provided in the external wall of the body. This second gorge 37 is provided towards the second end 33. The second gorge 37 is also intended to receive second sealing elements 38, which are shown in FIG. 3. The second sealing elements 38 are able to cooperate with the internal surface 24 of the first tubular portion of the fan shaft 5. The second gorge 37 is also supported by a second annular collar 33*a* which extends radially outside the body with respect to the axis A of the body.

The cover 30 also has a radial wall 39 centred on the longitudinal axis X, which partially closes the first cover 30 at the level of its second end 33. In other words, the longitudinal body 31 rises from the radial wall 39. The radial wall 39 is defined substantially in a plane which is perpendicular to the axis A or the longitudinal axis X.

In FIG. 2, the cover 30 is mounted in the first tubular segment 5*a* so as to cover and seal the annular squealer cavity 25. The cover 30 is mounted axially at the level of the distal end 23 of the first tubular portion 5*a* of the fan shaft 5 and the body extends downstream and inside the first portion of the tubular 5*a*. In particular, the cover 30 is located axially upstream of the second rolling bearing 7.

Even more precisely and as illustrated in detail in FIG. 3, the first end 32 is attached to the distal end 23 of the first tubular portion 5*a* (free end of the fan shaft 5). Advantageously, but not restrictively, the first end 32 is mounted tightened in the fan shaft 5. The external diameter D2 of the cover 30 is less than or substantially equal to the minimum internal diameter Dmin of the fan shaft 5 at the level of the distal end 23. Axial retention means 40 are arranged to hold the first end 32 of the cover 30 in an axial position relative to and inside the fan shaft 5.

In FIG. 3, the axial retaining means 40 comprise a split annulus 41 which is received in an annular groove open on the internal surface 24 and at the distal end 23 of the first tubular portion 5a. The groove faces the inside of the fan shaft. The split annulus 41 forms a circlip and is arranged upstream of the first end 32 of the cover 30. Similarly, the split annulus 41 is mounted upstream of an anti-rotation pin 42 engaged in a nut 43. The nut 43 is screwed onto the distal end 23 of the second tubular portion 5a of the fan shaft 5. The nut 43 is in axial abutment against a shoulder on the disc 3a of the fan 3. In this way, the nut 43 allows to immobilise the disc 3a axially on the fan shaft 5 and the anti-rotation pin 42 ensures, on the one hand, the blocking in rotation of the nut 43 relative to the fan shaft 5 and on the other hand, the accidental loosing of the nut 43.

As can also be seen in FIG. 3, the second end 33 of the cover 30 is arranged inside the first tubular portion 5a. More specifically, the second end 33 is arranged at the level of an annular bulge 45 in the first tubular portion 5a. The bulge 45 projects radially inwards from the fan shaft 5. The bulge 45 also delimits the downstream annular squealer cavity 25. The bulge 45 has an internal radial surface 46 which defines an internal diameter Dmin2 which is less than the minimum internal diameter Dmin of the fan shaft 5 at the level of the distal end 23. Similarly, the external diameter D1 of the cover 30 at its second end 33 is less than or equal to the diameter Dmin2. In this way, the second end 33 of the cover 30 is in radial abutment against the annular bulge 45. The second sealing elements 38 are also arranged radially between the bulge 45 and the second end 33 of the cover 30. The second sealing elements 38 comprise an O-ring.

With reference to FIGS. 3 and 4, when the cover 30 is inserted inside the fan shaft, the second end 33 of the cover can be inserted without blocking at the level of the inlet of the fan shaft (distal end 23), and then the surface 33b (see FIG. 4) of the second collar 33a comes into flat abutment with the surface 46 (see FIG. 3) of the bulge. The O-ring 38 collapses between the gorge 37 and the surface 46. Similarly, the surface 32b (see FIG. 4) of the first collar 32a comes into flat abutment with the internal surface (see FIG. 3) of the fan shaft at the inlet of the latter. The annular seal 36 collapses between the gorge 34 and the internal surface.

In this way, the annular squealer cavity 25 is axially covered by the longitudinal body 31 of the cover 30 and the sealing elements 36, 38 mounted upstream and downstream seal the squealer cavity 25. The lubricant no longer circulates upstream in the fan shaft 5 because it is blocked by the radial wall 39. In addition, another fluid such as water originating from the melting of ice blocks, in the event of accretion on the cone 14 (during icing conditions for example), is conveyed directly to the inside of the cover 30. Using the centrifugal force, the inclined body 31 of the cover allows the fluid to evacuate out of the cover 30. The fluid would slide outwards over the internal wall 47 of the body as shown by the arrow F. The squealer cavity 25 is, in other words, closed by the body 31 of the cover 30 and the sealing elements 36, 38.

Figure 5:
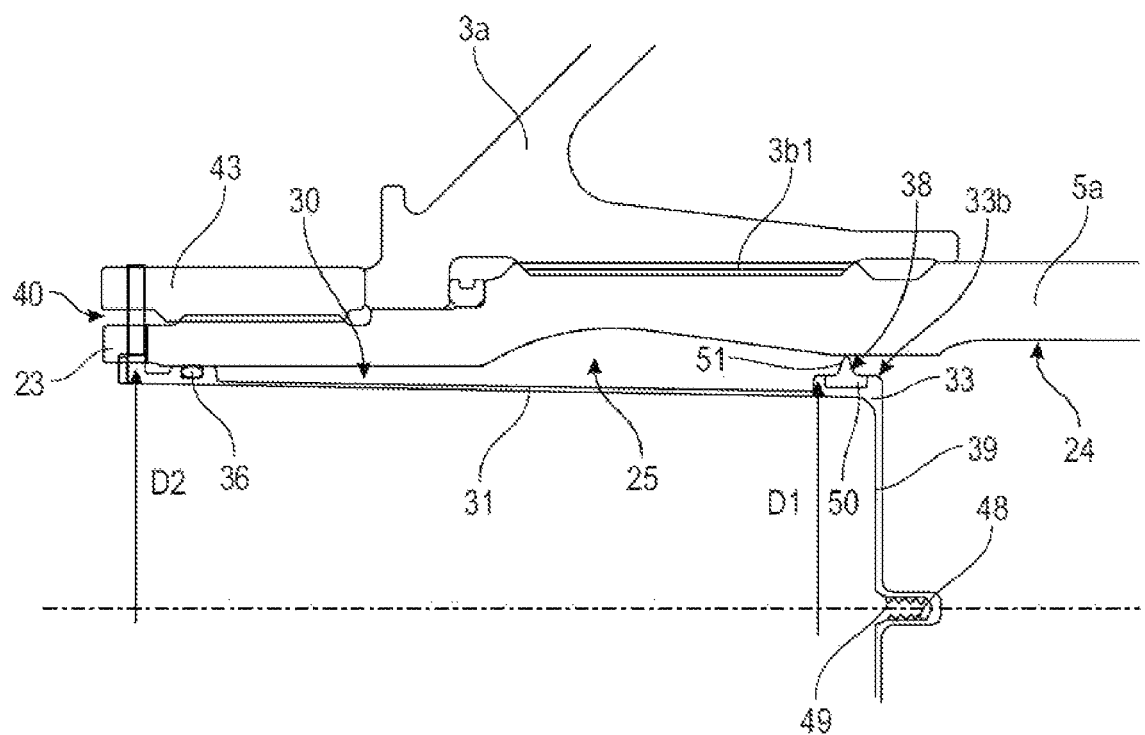

A further embodiment of the arrangement of the cover 30 in the fan shaft 5 is shown in FIG. 5. In this example, the fan shaft 5 has no bulge. The second end 33 of the cover 30 is positioned downstream of the squealer cavity 25. The second sealing elements 38 (installed in the gorge 37) comprise an annular seal with an annular body 50 and a radial lip 51 extending from the body 50. This radial lip 51 is flexible. When installed, the radial lip 51 is in radial abutment against the internal surface 24 of the first tubular portion 5a. When the cover 30 is inserted inside the fan shaft, the lip seal will be able to bend at the entrance to the fan shaft (distal end 23) and return to its shape when it has more space radially (below the splines 3b1 for example). The surface 33b of the second collar is located at a radial distance from the internal surface 24 of the fan shaft 5, unlike the flexible radial lip 51. As in the first embodiment, the annular squealer cavity 25 is axially covered by the longitudinal body 31 of the cover 30 and the sealing elements 36, 38 mounted upstream and downstream seal the squealer cavity.

In the various embodiments, and in order to allow an easy extraction of the first cover 30 from upstream of the fan shaft 5, the radial wall 39 of the first cover 30 comprises a cylindrical bore 48 centred on the longitudinal axis X. This cylindrical bore 48 comprises a thread 49 intended to cooperate with a tool (not shown) having a threaded segment. This configuration allows the first cover 30 to be grasped without effort or obstruction.

The invention claimed is:

1. A fan module for a turbomachine comprising a cylindrical fan shaft of the fan with a longitudinal axis X driven in rotation by a power shaft via a speed reducer and a lubrication chamber through which at least one portion of the fan shaft and of the power shaft pass axially, and in which are arranged at least one first bearing configured to support and guide in rotation and the speed reducer, the fan shaft comprising at least one first tubular portion forming part of the chamber and being closed by a cover, the first tubular portion comprising a distal end and a proximal end opposite one another along the longitudinal axis X and an annular squealer cavity provided in an internal surface of the fan shaft, between the distal end and the proximal end, wherein said cover comprises a body which extends along the longitudinal axis X and which is mounted in the first tubular segment so as to cover and seal the annular squealer cavity.

2. The fan module according to claim 1, wherein the body extends between a first end and a second end along the longitudinal axis X, and comprises a circular cross-section with a diameter varying between the first end and the second end.

3. The fan module according to claim 2, wherein the first end comprises a first gorge open onto an external wall of the body and following a circumference thereof, the first gorge being configured to receive first sealing elements that cooperate with the internal surface of the first tubular portion of the fan shaft.

4. The fan module according to claim 3, wherein the second end comprises a second gorge open onto the external wall of the body and following the circumference thereof, the second gorge being configured to receive second sealing elements that cooperate with the internal surface of the first tubular portion of the fan shaft.

5. The fan module according to claim 2, wherein the first end is attached to the distal end of the first tubular portion and the second end is arranged inside the first tubular portion.

6. The fan module according to claim 2, wherein the first tubular portion comprises an annular bulge projecting radially inward from the fan shaft and delimiting the squealer cavity downstream, the second end of the cover coming into radial abutment against the annular bulge.

7. The fan module according to claim 4, wherein the second sealing elements comprise a flexible radial lip configured to bear radially against the internal surface of the first tubular portion.

8. The fan module according to claim 2, wherein the cover has a maximum external diameter (D1) smaller than a minimum internal diameter (Dmin) of the first tubular portion of the fan shaft.

9. The fan module according to, claim 1, wherein the cover is removably mounted in the first tubular portion of the fan shaft.

10. A turbomachine comprising the fan module according to claim 1.

* * * * *